United States Patent [19]

Arai et al.

[11] Patent Number: 4,964,762

[45] Date of Patent: Oct. 23, 1990

[54] COMBINATION OF CUTTER AND FASTNER UNIT THEREFOR

[75] Inventors: Tatsuo Arai, Kitamoto; Takayoshi Saito, Nishishinagawa, both of Japan

[73] Assignee: Mitsubishi Kinzoku Kabushiki Kaisha, Tokyo, Japan

[21] Appl. No.: 244,825

[22] Filed: Sep. 15, 1988

[30] Foreign Application Priority Data

Sep. 18, 1987 [JP] Japan ................................ 62-142675
Sep. 22, 1987 [JP] Japan ................................ 62-144715
Sep. 22, 1987 [JP] Japan ................................ 62-144715

[51] Int. Cl.$^5$ .............................................. B26D 1/12
[52] U.S. Cl. .......................................... 407/34; 407/47
[58] Field of Search ................... 407/30, 39, 40, 35, 407/36, 46, 101, 47, 48, 102

[56] References Cited

U.S. PATENT DOCUMENTS

2,805,468  9/1957  Williams ............................. 407/47
3,839,772  8/1974  Shimomura et al. ................ 407/46

Primary Examiner—Frederick R. Schmidt
Assistant Examiner—Lawrence Cruz
Attorney, Agent, or Firm—Cushman, Darby & Cushman

[57] ABSTRACT

A combination of a cutter and a fastener unit for fastening the cutter to a tool attachment shaft. The cutter includes a cutter body formed therein with a threaded bore. The fastener unit includes a fastener element having one axial end portion provided on its outer peripheral surface with first threads threadedly engageable with a threaded bore in the tool attachment shaft. The other axial end portion of the fastener element is provided on its outer peripheral surface with second threads threadedly engageable with the threaded bore in the cutter body. The first threads are reverse in a direction of helix to the second treads. An end face of the other axial end portion has a size at most equal to an inner diameter of the threaded bore in the cutter body. If the fastener unit includes a clamper in addition to the fastener element, the cutter body is formed therein with a through bore in place of the threaded bore, and the clamper is received in the through bore. The clamper is formed therein with a threaded bore with which the threads on the one axial end portion of the fastener element is engageable.

7 Claims, 4 Drawing Sheets

COMBINATION OF CUTTER AND FASTNER UNIT THEREFOR

BACKGROUND OF THE INVENTION

1. Field of the Invention

The present invention relates to a combination of a cutter such as, for example, a face milling cutter and a fastener unit for fastening the cutter to a tool attachment shaft such as, for example, an arbor for a machine tool.

2. Prior Art

Figure 1:
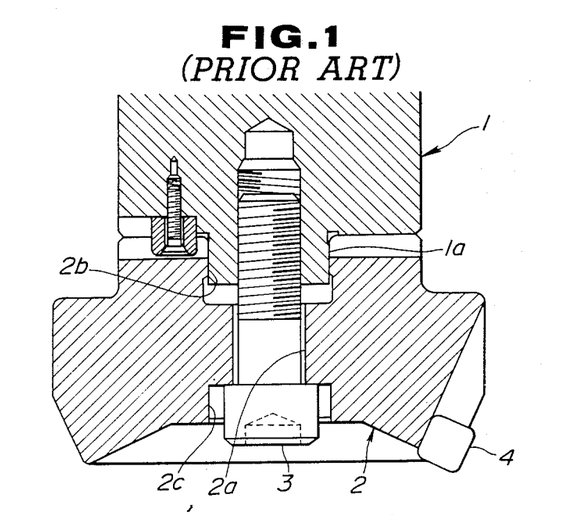
FIG. 1 is a cross-sectional view of a conventional combination of and a fastener unit therefor.
Figure 2:
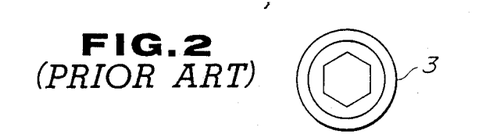
FIG. 2 is an end view of a head of a bolt shown in FIG. 1.

FIGS. 1 and 2 of the accompanying drawings depict one conventional combination of a cutter and a fastener unit therefor hitherto known. The cutter includes a cutter body 2 adapted to be fastened to a forward end of a tool attachment shaft or an arbor 1 by means of a fastener unit including a bolt 3. A plurality of cutter inserts 4 are mounted on an outer periphery of a forward end of the cutter body 2 in circumferentially equidistantly spaced relation to each other. The body 2 is formed at its center with a through bore 2a through which the bolt 3 passes. A rearward end face of the cutter body 2 is formed at its center with a recess 2b into which a projection 1a on a forward end face of the arbor 1 is fitted. The forward end face of the cutter body 2 is formed at its center with a counterbore 2c in which a head of the bolt 3 is accommodated.

It is essential for the above conventional arrangement to form the counterbore 2c in the forward end face of the body 2, in order to prevent the head of the bolt 3 from protruding forwardly from the cutter inserts 4. Provision of such counterbore 2c reduces the area of the forward end face of the body 2, resulting in such a defect that it is difficult to secure sufficient regions for attachment of clamp screws for the inserts 4, to the cutting body 2. Because of the defect, there arise such problems that it is not easy to design the regions where the clamp screws are attached, and that provision of threaded bores, with which the clamp screws are threadedly engaged, in the narrow regions reduces the rigidity of the cutter body 2, resulting in a deterioration of the cutting performance of the cutter.

Figure 3:
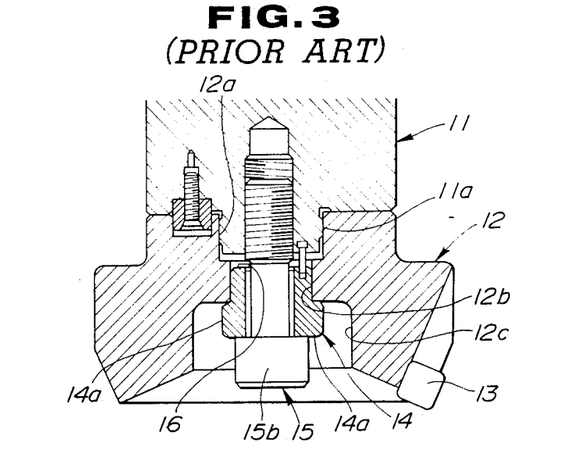
FIG. 3 is a view similar to FIG. 1, but showing another conventional combination.
Figures 4, 5:
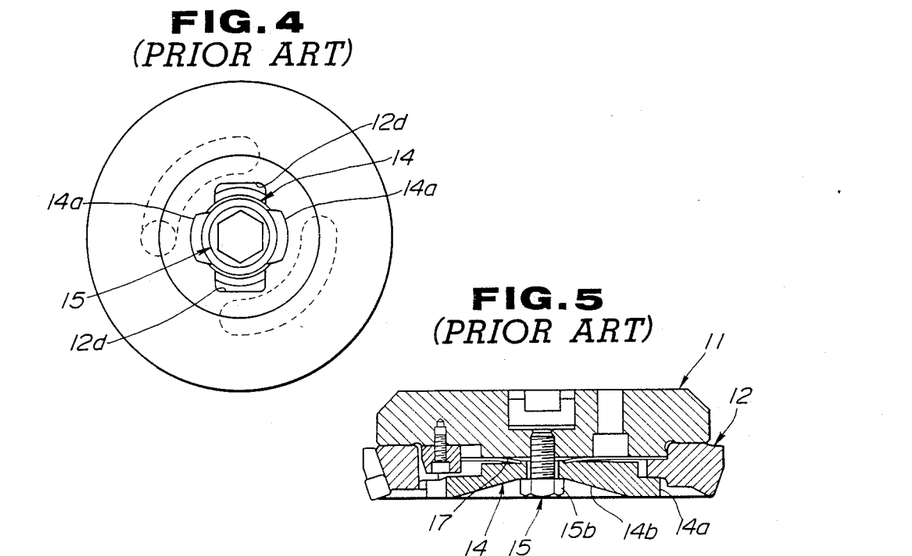
FIG. 4 is a front elevation of the combination illustrated in FIG. 3.
FIG. 5 is a view similar to FIG. 1, but showing still another conventional combination.

Another conventional arrangement shown in FIGS. 3 and 4 is also known from Japanese Patent Publication No. 60-3538. A plurality of cutter inserts 13 are mounted on an outer periphery of a forward end face of a cutting body 12 in circumferentially spaced relation to each other. The cutter body 12 is formed at its center with a stepped through bore composed of a large-diameter bore section 12a, a small-diameter bore section 12b and a recess 12c, which are arranged in the mentioned order from a rearward end face of the body 12 facing toward a forward end face of an arbor 11. The large-diameter bore section 12a has such an accurate and precise inner diameter that an axial projection 11a on the forward end face of the arbor 11 can be fitted into the large-diameter bore section 12a. As shown in FIG. 4, a pair of diametrically opposed axial grooves 12d and 12d are formed in the peripheral wall surface of the small-diameter bore section 12b. The cutter body 12 is adapted to be fastened to the forward end of the arbor 11 by means of a clamper 14 and a bolt 15.

The clamper 14 is generally cylindrical in shape, and a pair of diametrically opposed projections 14a and 14a extend radially outwardly from an outer peripheral surface of one axial end of the clamper 14. Each of the pair of projections 14a is formed into a size capable of passing through a corresponding one of the pair of axial grooves 12d and 12d in the body 12. The clamper 14 is mounted on the bolt 15 in such a manner that the clamper 14 is urged against a head 15a of the bolt 15 under biasing force of a spring washer 16 which is fitted around the shank of the bolt 15 so as to be interposed between the clamper and the threaded portion of the bolt.

For fastening the cutter body 12 to the arbor 11, the bolt 15 having the clamper 14 mounted thereon is first screwed into the arbor 11. The spacing between the end face of the projection 11a on the arbor 11 and axial end faces of the respective projections 14a and 14a on the clamper 14, which face toward the end face of the projection 11a, is brought to a value slightly larger than the axial thickness of arcuate sections of the cutter body 12 extending between the pair of axial grooves 12d and 12d, i.e., the axial length of the small-diameter bore section 12b. In this state, the cutter body 12 is arranged in front of the head of the bolt 15, and the pair of axial grooves 12d and 12d in the cutter body 12 are axially aligned respectively with the pair of projections 14a and 14a on the clamper 14. The cutter body 12 is then moved toward the forward end face of the arbor 11, while the pair of projections 14a and 14a move respectively in and along the pair of axial grooves 12d and 12d. The projection 11a on the arbor 11 is fitted into the large-diameter bore section 12a in the cutter body 12. Subsequently, the cutter body 12 is moved angularly about the axis thereof relatively to the clamper 14 to a position where the arcuate sections between the axial grooves 12d and 12d in the cutter body 12 are located between the respective projections 14a and 14a on the clamper 14 and the projection 11a on the arbor 11 and are overlapped respectively with the projections 14a and 14a. As the bolt 15 is tightened, the arcuate sections between the axial groves 12d and 12d in the cutter body 12 are urged respectively by the projections 14a and 14a on the clamper 14 so that the cutter body 12 is fixedly fastened to the arbor 11.

On the other hand, when it is desired to remove the cutter body 12 from the arbor 11, the bolt 15 is first loosened. The clamper 14 is moved together with the head of the bolt 15 under the action of the spring member 16 so that the projections 14a and 14a on the clamper 14 move away from the respective arcuate sections between the axial grooves 12d and 12d in the cutter body 12. Subsequently, the cutter body 12 is moved angularly about the axis thereof relatively to the clamper 14 to bring the axial grooves 12d and 12d into alignment with the respective projections 14a and 14a on the clamper 14. The cutter body 12 is then moved away from the forward end of the arbor 11, and is removed therefrom.

Still another conventional arrangement shown in FIG. 5 is also known from Japanese Patent Publication No. 60-165. The arrangement shown in FIG. 5 is similar to that illustrated in FIGS. 3 and 4, but is different from the latter in that a spring member 17 is arranged between the clamper 14 and the arbor 11. The clamper 14 is urged against the head of the bolt 15 under the biasing force of the spring member 17. As the bolt 15 is loosened when the cutter body 12 is fixedly fastened to the arbor 11, the projections 14a on the clamper 14 move away from the respective arcuate sections between the axial grooves 12d and 12d in the cutter body 12. A recess 14b is formed at a center of the forward end face of the clamper 14 so as to prevent the head of the bolt 15 from protruding outwardly from the plane including the cutter inserts 13.

As described above, in the conventional arrangement illustrated in FIGS. 3 and 4 or FIG. 5, the spring member 16 or 17 is provided for urging the clamper 14 against the head of the bolt 15 so as to prevent the clamper 14 from moving between the forward end face of the arbor 11 and the head of the bolt 15, thereby facilitating attachment and detachment of the cutter body 12 to and from the arbor 11. In this manner, the spring member 16 or 17 is required for the conventional arrangement, and portions associated with the spring member 16 or 17 are complicated in construction inevitably. This results in an increase in the cost.

Moreover, the recess 12c is formed in the forward end face of the cutter body 12 as shown in FIG. 3, or the recess 14b is formed in the forward end face of the clamper 14 as shown in FIG. 5, in order to prevent the head of the bolt 15 from protruding outwardly from the plane including the cutter inserts 13. Because of the provision of such recess 12c or 14b, such a problem arises that the rigidity of the cutter body 12 or the clamper 14 is reduced.

SUMMARY OF THE INVENTION

It is therefore an object of the invention to provide a combination of a cutter and a fastener unit therefor, which can secure a sufficient area of a forward end face of a cutter body.

It is another object of the invention to provide a combination of a cutter and a fastener unit therefor, which is simple in construction and which can provide a cutter body or a clamper with a sufficient rigidity.

According to the invention, there is provided a combination of a cutter and a fastener unit for fastening the cutter to a forward end of a tool attachment shaft in coaxial relation thereto, the forward end being formed in its end face with a threaded bore extending along an axis of the tool attachment shaft, the cutter including a cutter body formed therein with a threaded bore which extends through the cutter body in coaxial relation to the threaded bore in the forward end of the tool attachment shaft, and the fastening means including a fastener element having one and other axial end portions, the one axial end portion being provided on its outer peripheral surface with first threads threadedly engageable with the threaded bore in the forward end of the tool attachment shaft, the other axial end portion being provided on its outer peripheral surface with second threads threadedly engageable with the threaded bore in the cutter body, the first threads being reverse in a direction of helix to the second threads, and an end face of the other axial end portion having a size at most equal to an inner diameter of the threaded bore in the cutter body.

According to the invention, there is further provided a combination of a cutter and a fastener unit for fastening the cutter to a forward end of a tool attachment shaft in coaxial relation thereto, the forward end being formed in its end face with a threaded bore extending along an axis of the tool attachment shaft, the cutter including a cutter body formed therein with a through bore extending in coaxial relation to the threaded bore in the forward end of the tool attachment shaft, the cutter body having at least two axial grooves which are formed in a peripheral wall surface of the through bore and which extend in parallel relation to an axis of the through bore, the axial grooves being spaced from each other along the peripheral wall surface of the through bore, the fastener unit including a clamper formed therein with a threaded bore extending through the clamper in coaxial relation to the threaded bore in the forward end of the tool attachment shaft, the clamper having one axial end portion thereof adjacent the forward end of the tool attachment shaft, the one axial end portion of the clamper being received in the through bore of the cutter body in such a manner that the cutter body is movable angularly about the axis of the through bore relatively to the clamper, the clamper having at least two projections projecting radially outwardly from the other axial end portion of the clamper, the arrangement being such that only when the axial grooves in the cutter body are aligned respectively with the projections on the clamper, the cutter body is permitted to move axially toward and away from the forward end of the tool attachment shaft relatively to the clamper while the projections move respectively in and along the axial grooves, and the fastener unit further including a fastener element having one and other axial end portions, the one axial end portion of the fastener element being provided on its outer peripheral surface with first threads threadedly engageable with the threaded bore in the forward end of the tool attachment shaft, the other axial end portion of the fastener element being provided on its outer peripheral surface with second threads threadedly engageable with the threaded bore in the clamper, the first threads being reverse in a direction of helix to the second threads, and an end face of the other axial end portion of the fastener element having a size at most equal to an inner diameter of the threaded bore in the clamper.

DESCRIPTION OF PREFERRED EMBODIMENTS OF THE INVENTION

The invention will be described below, by way of mere examples, with reference to FIGS. 6 through 11 of the accompanying drawings.

Figure 6:
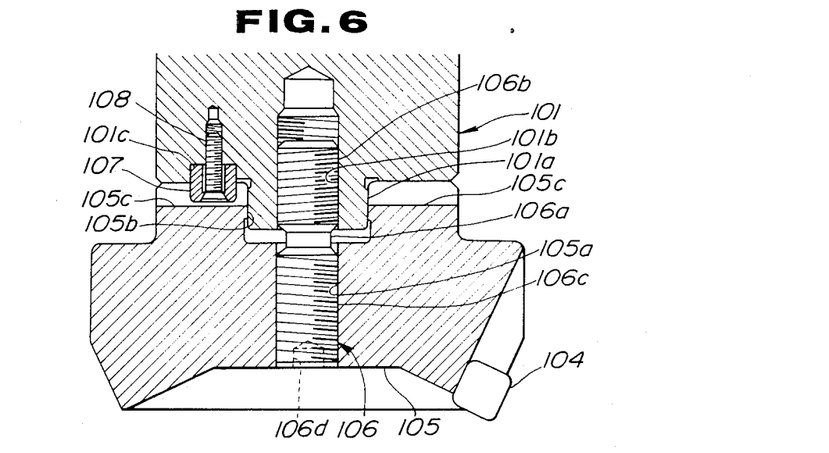
FIG. 6 is a cross-sectional view of a combination of a cutter and a fastener unit therefor according to a first embodiment of the invention.
Figure 7:
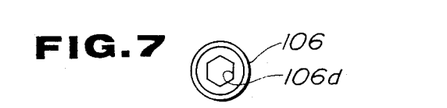
FIG. 7 is an end view of a fastener element shown in FIG. 6.

Referring first to FIGS. 6 and 7, there is shown a combination of a cutter and a fastener unit therefor, according to a first embodiment of the invention in which the cutter includes a cutter body 105 adapted to be fastened to a forward end of a tool attachment shaft or an arbor 101 by means of a fastener unit including a fastener element 106.

The arbor 101 is formed, at a center of its forward end face, with an axial projection 101a. The projection 101a is formed, at a center of its end face, with an axially extending threaded bore 101b provided with right-hand threads. Moreover, a recess 101c is formed in the forward end face of the arbor 101. A key 107 is fitted into the recess 101c and is fixedly mounted to the arbor 101 by means of a screw 108.

The cutter further includes a plurality of cutter inserts 104 mounted on an outer periphery of a forward end of the cutter body 105 remote from the forward end face of the arbor 101, the inserts 104 being arranged in circumferentially spaced relation to one another. The body 105 is formed at its center with an axially extending threaded bore 105a provided with left-hand threads and extending through the body 105. A recess 105b is formed in a rearward end face of the cutter body 105 which faces toward the forward end face of the arbor 101. The recess 105b is arranged in coaxial relation to the threaded bore 105a in the body 105. The projection 101b on the arbor 101 can be fitted into the recess 105b. The cutter body 105 is formed in its rearward end face with a plurality of radially extending key grooves 105c which are spaced circumferentially equidistantly to each other. The aforesaid key 107 can be fitted into any one of the radial key grooves 105c.

A circumferential relief groove 106a is formed at a longitudinal intermediate section of the fastener element 106. Threads 106b are formed on an outer peripheral surface of one axial end portion of the fastener element 106, which extends from the relief groove 106a to one axial end face of the fastener element 106 remote from the forward end face of the cutter body 105. The threads 106b are threadedly engageable with the threaded bore 101b in the arbor 101. Likewise, threads 106c are formed on an outer peripheral surface of the other axial end portion of the fastener element 106 extending from the relief groove 106a to the other axial end face of the fastener element 106. The threads 106c are threadedly engageable with the threaded bore 105a in the cutter body 105. The threads 106b on the one axial end portion are reverse in a direction of helix to the threads 106c on the other axial end portion. Specifically, the threads 106b on the one axial end portion are right-hand threads, while the threads 106c on the other axial end portion are left-hand threads. As clearly shown in FIG. 7, the fastener element 106 has a recess 106d of a hexagonal cross-section formed in the end face of the other axial end portion provided with the threads 106c. The end face of the other axial end portion of the fastener element 106 has a size equal to or smaller than an inner diameter of the threaded bore 105a in the cutter body 105. In the illustrated embodiment, the end face of the other axial end portion of the fastener element 106 has an outer diameter substantially equal to the inner diameter of the threaded bore 105a in the cutter body 105.

In the arrangement illustrated in FIGS. 6 and 7, when it is desired to fasten the cutter body 105 to the forward end of the arbor 101, the cutter body 105 is first arranged in such a manner that the threaded bore 105a in the cutter body 105 extends in coaxial relation to the threaded bore 101b in the arbor 101, but is sufficiently spaced away from the threaded bore 101b. Then, the fastener element 106 is arranged between the cutter body 105 and the arbor 101 in coaxial relation to both the threaded bores 101b and 105a. Specifically, the end face of the one axial end portion of the fastener element 106 is arranged at an opening of the threaded bore 101b in the arbor 101, while the end face of the other axial end portion of the fastener element 106 is arranged at an opening of the threaded bore 105a in the rearward end face of the cutter body 105. An allen wrench having a hexagonal cross-sectional shape is inserted through the threaded bore 105a in the cutter body 105, and a forward end of the allen wrench is fitted into the hexagonal recess 106d in the fastener element 106. The allen wrench is turned to rotate the fastener element 106 about its axis, thereby bringing the threads 106b on the one axial end portion of the fastener element 106 into threaded engagement with the threaded bore 101b in the arbor 102. On the other hand, the threads 106c on the other axial end portion of the fastener element 106 are brought into threaded engagement with the threaded bore 105a in the cutter body 105, while the cutter body 105 is so supported as not to be rotated together with the fastener element 106. By doing so, the one axial end portion of the fastener element 106 is screwed into the threaded bore 101b in the arbor 101, while the other axial end portion of the fastener element 106 is screwed into the threaded bore 105a in the cutter body 105. Thus, the cutter body 105 is moved toward the forward end face of the arbor 101, so that the projection 101a on the arbor 101 is fitted into the recess 105b in the cutter body 105, and the key 107 is fitted into one of the radial key grooves 105c. Finally, the rearward end face of the cutter body 105 is abutted against the forward end face of the arbor 101, and the cutter body 105 is fixedly fastened to the arbor 101.

When the fastener element 106 is turned about its axis in the direction opposite to that described above, the cutter body 105 is gradually moved away from the arbor 101 and, finally, is removed or detached therefrom.

In the arrangement illustrated in FIGS. 6 and 7, the cutter body 105 is fixedly fastened to the arbor 101 by means of the fastener element 106 having no head. In other words, the end face of the other axial end portion of the fastener element 106 has a size at most equal to the inner diameter of the threaded bore 105a in the cutter body 105. Accordingly, it is dispensed with to provide the forward end face of the cutter body 105 with a counterbore for accommodating therein the head, unlike the conventional arrangement mentioned previously with reference to FIGS. 1 and 2. Thus, the forward end face of the cuter body 105 can be utilized widely, making it possible to facilitate the design of the portions of the cutter body 105 where the clamp screws or the like for the cutter inserts 104 are attached. Moreover, it is also possible to minimize a reduction in rigidity of the cutter body 105, enabling the cutting performance of the cutter to be improved.

The one and other axial end portions of the fastener element 106, on which the threads 106b and 106c are formed respectively, may be different in axial length and/or diameter from each other. Further, the threads 106b may be different in pitch from the threads 106c. If the length of the one axial end portion provided with the threads 106b are longer than that of the other axial end portion provided with the threads 106c, or if the threads 106c are larger in pitch than the threads 106b, the cutter body 105 can be detached from the arbor 101 with the fastener element 106 maintained threadedly engaged with the threaded bore 101b in the arbor 101, making it possible to enhance the detachability of the cutter body 105. If the diameter of the threads 106c is selected to be large, a large wrench can be utilized, so that the detachability of the cutter body can be further improved.

Figure 8:
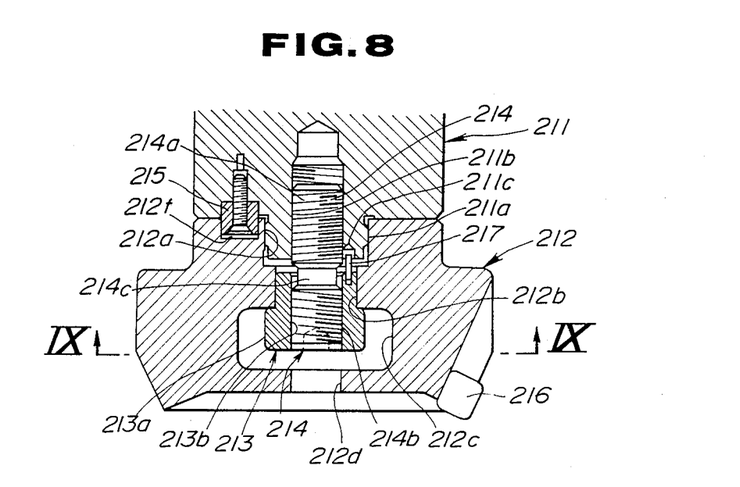
FIG. 8 is a view similar to FIG. 6, but showing a second embodiment of the invention.
Figure 9:
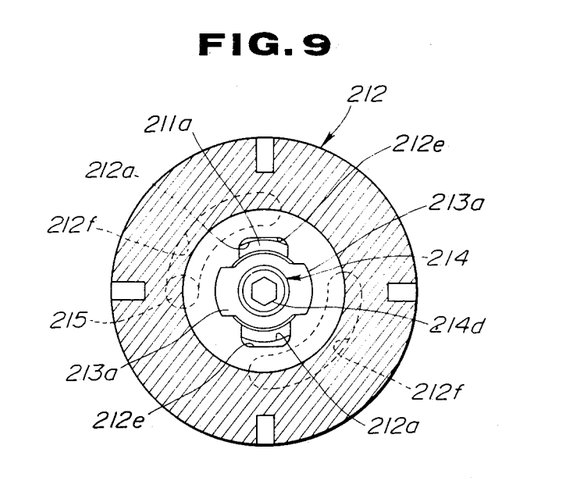
FIG. 9 is a cross-sectional view taken along the line IX—IX in FIG. 8.

Referring to FIGS. 8 and 9, there is shown a combination of a cutter and a fastener unit therefor, according to a second embodiment of the invention. In the second embodiment, the cutter includes a cutter body 212 adapted to be fastened to a forward end of a tool attachment shaft or an arbor 211 by means of a fastener unit including a clamper 213 and a fastener element 214.

The arbor 211 is formed, at a center of its forward end face, with an axially extending projection 211a. An axially extending threaded bore 211b provided with right-hand threads is formed at a center of the end face of the projection 211a. Further, a key 215 is mounted to the forward end face of the arbor 211 at a location spaced a predetermined distance radially outwardly from the axis of the arbor 211.

In addition to the cutter body 212, the cutter further includes a plurality of circumferentially equidistantly spaced cutter inserts 216 which are mounted to an outer periphery of a forward end face of the cutter body 212 remote from the forward end face of the arbor 211. A stepped through bore is formed in the cutter body 212 and extends along the axis thereof. The stepped through bore is composed of a large-diameter bore section 212a, a small-diameter bore section 212b, a cavity section 212c and a tool insertion bore section 212d, which are arranged in the mentioned order from a rearward end face of the cutter body 212 facing toward the forward end face of the arbor 211. The large-diameter bore section 212a has such an inner diameter that the projection 211a on the arbor 211 is fitted precisely into the large-diameter bore section 212a. As shown in FIG. 9, a pair of diametrically opposed axial grooves 212e and 212e are formed in the peripheral wall surface of the small-diameter bore section 212b, and extend over the entire axial length of the peripheral wall surface of the small-diameter bore section 212b. A pair of diametrically opposed key grooves 212f and 212f are formed in the rearward end face of the cutter body 212. The aforesaid key 215 can be fitted into one of the pair of key grooves 212f and 212f. Each of the key grooves 212f is formed into an arcuate shape whose center of curvature is located on the axis of the cutter body 212. The key groove 212f extends over an angular extent of 90 degrees.

The clamper 213 has an outer diameter capable of being fitted into the small-diameter bore section 212b in the cutter body 212. Specifically, the clamper 213 has one axial end portion thereof adjacent the forward end face of the arbor 211. The one axial end portion of the clamper 213 is received in the small-diameter bore section 212b in the cutter body 212 in such a manner that the cutter body 212 is movable angularly about the axis thereof relatively to the clamper 213. The clamper 213 has a pair of diametrically opposed projections 213a and 213a which project radially outwardly from the other axial end portion of the clamper 213. The arrangement is such that only when the axial grooves 212e and 212e in the cutter body 212 are axially aligned respectively with the projections 213a and 213a on the clamper 213, the cutter body 212 is permitted to move axially toward and away from the forward end face of the arbor 211 relatively to the clamper 213, while the projections 213a and 213a move respectively in and along the axial grooves 212e and 212e. The clamper 213 is formed therein with a threaded bore 213b provided with left-hand threads. The threaded bore 213b extends through the clamper 213 in coaxial relation to the threaded bore 211b in the forward end of the arbor 211. Further, an axially extending positioning pin 217 is fixedly mounted to the step between the large-diameter bore section 212a and the small-diameter bore section 212b in the cutter body 212. On the other hand, a positioning bore 211c, into which the positioning pin 217 can be fitted, is formed in the end face of the projection 211a on the arbor 211.

The fastener element 214 has one axial end portion which is provided on its outer peripheral surface with right-hand threads 214a threadedly engageable with the threaded bore 211b in the end face of the projection 211a on the arbor 211. The other axial end portion of the fastener element 214 is provided on its outer peripheral surface with left-hand threads 214b threadedly engageable with the threaded bore 213b in the clamper 213. An end face of the other axial end portion provided with the threads 214b has a size equal to or smaller than an inner diameter of the threaded bore 213b in the clamper 213. In the illustrated embodiment, the end face of the other axial end portion of the fastener element 214 is substantially equal in diameter to the threaded bore 213b in the clamper 213. The fastener element 214 has a longitudinally intermediate section between the one and other axial end portions thereof. The intermediate section is formed on its outer peripheral surface with a circumferential relief groove 214c. As shown in FIG. 9, the fastener element 214 has a recess 214d of a hexagonal cross-section formed in the end face of the other axial end portion provided with the threads 214b.

In the arrangement illustrated in FIGS. 8 and 9, when it is desired to fasten the cutter body 212 to the arbor 211, the clamper 214 is first arranged in such a manner that the threaded bore 213b in the clamper 213 extends in coaxial relation to the threaded bore 211b in the arbor 211, but is sufficiently spaced away from the threaded bore 211b. Then, the fastener element 214 is arranged between the end face of the projection 211a on the arbor 211 and the clamper 213 in coaxial relation to both the threaded bores 211b and 213b. Subsequently, the right-hand threads 214a on the one axial end portion of the fastener element 214 is arranged at an opening of the threaded bore 211b in the end face of the projection 211a on the arbor 211, while the left-hand threads 214b on the other axial end portion of the fastener element 214 is arranged at an opening of the threaded bore 213b in the rearward end face of the clamper 213. Subsequently, an allen wrench having a hexagonal cross-sectional shape is inserted through the threaded bore 213b in the clamper 213, and a forward end of the allen wrench is fitted into the hexagonal recess 214d in the end face of the other axial end portion of the fastener element 214. The allen wrench is then turned to screw the one axial end portion of the fastener element 214 into the threaded bore 211b in the arbor 211. At this time, the clamper 213 is supported against rotation together with the fastener element 214. The turning movement of the allen wrench causes the right-hand threads 214a on the one axial end portion of the fastener element 214 to be threadedly engaged with the threaded bore 211b in the arbor 211, and also causes the left-hand threads 214b on the other axial end portion of the fastener element 214 to be threadedly engaged with the threaded bore 213b in the clamper 213, so that the clamper 213 is moved toward the forward end face of the arbor 211. When the clamper 213 is moved toward the forward end face of the arbor 211, the positioning pin 217 fixedly mounted to the clamper 213 is fitted into the positioning bore 211c in the arbor 211. The spacing between the end face of the projection 211a on the arbor 211 and axial end faces of the respective projections 213a and 213a on the clamper 213, which face toward the end face of the projection 211a, is brought to a value slightly larger than the axial thickness of arcuate sections between the pair of axial grooves 212e and 212e in the cutter body 212, i.e., the axial length of the small-diameter bore section 212b. In this state, the allen wrench is once disengaged from the hexagonal recess 214d in the fastener element 214.

The cutter body 212 is then arranged in front of the fastener unit including the clamper 213 and the fastener element 214, and the pair of axial grooves 212e and 212e in the cutter body 212 are aligned respectively with the pair of projections 213a and 213a on the clamper 213. Subsequently, the cutter body 212 is moved axially toward the forward end face of the arbor 211, while the pair of projections 213a and 213a are moved respectively in and along the pair of axial grooves 212e and 212e. The projection 211a on the arbor 211 is fitted into the large-diameter bore section 212a in the cutter body 212. At the same time, the key 215 on the forward end face of the arbor 211 is fitted into one of the pair of key grooves 212f and 212f in the cutter body 212. Subsequently, the cutter body 212 is moved angularly about the axis thereof relatively to the clamper 213 in a direction opposite to that in which the cutter body 212 is rotated at cutting. By doing so, the key 215 is abutted against one end of the key groove 212f in the cutter body 212 so that the cutter body 212 is located in position. Thus, the arcuate sections between the axial grooves 212e and 212e in the cutter body 212 are located between the respective projections 213a and 213a on the clamper 213 and the projection 211a on the arbor 211 and are overlapped with the respective projections 213a and 213a. The forward end of the allen wrench is inserted through the tool insertion bore section 212d in the cutter body 212, and is again fitted into the hexagonal recess 214d in the fastener element 214a. As the allen wrench is turned to rotate the fastener element 214 about its axis, thereby further tightening the fastener element 214, the arcuate sections between the axial grooves 212e and 212e in the cutter body 212 are urged respectively by the projections 213a and 213a on the clamper 213 so that the cutter body 212 is fixedly fastened to the arbor 211.

On the other hand, when it is desired to detach the cutter body 212 from the arbor 211, the fastener element 214 is rotated about its axis in the direction opposite to that described above. This causes the projections 213a and 213a on the clamper 213 to be moved away from the respective arcuate sections between the axial grooves 212e and 212e in the cutter body 212. Subsequently, the cutter body 212 is moved angularly about the axis thereof relatively to the clamper 213 to bring the axial grooves 212e and 212e into alignment with the respective projections 213a and 213a on the clamper 213. The cutter body 212 is then moved away from the forward end of the arbor 211, and is removed therefrom.

The arrangement of the second embodiment illustrated in FIGS. 8 and 9 i such that the fastener element 214 is composed of the one axial end portion provided with the right-hand threads 214a threadedly engageable with the threaded bore 211b in the arbor 211, and the other axial end portion provided with the left-hand threads 214b threadedly engageable with the threaded bore 213b in the clamper 213. With such arrangement, rotation of the fastener element 214 about its axis enables the clamper 213 to be moved toward and away from the arbor 211, so that the spring member required for the conventional arrangement can be dispensed with. Accordingly, the number of component parts is reduced, and the portions of the cutter body 212 where the clamp screws for the cutter inserts 216 are attached are simplified in construction, making it possible to reduce the cost.

Moreover, since the fastener element 214 has no head, it is possible to prevent the end face of the other axial end portion of the fastener element 214, from protruding axially outwardly from the axial end face of the clamper 213 remote from the forward end face of the arbor 211. Accordingly, the forward end face of the cutter body 212 can be covered leaving only the tool insertion bore section 212d through which the allen wrench is inserted, making it possible to enhance the rigidity of the cutter body 212.

Figure 10:
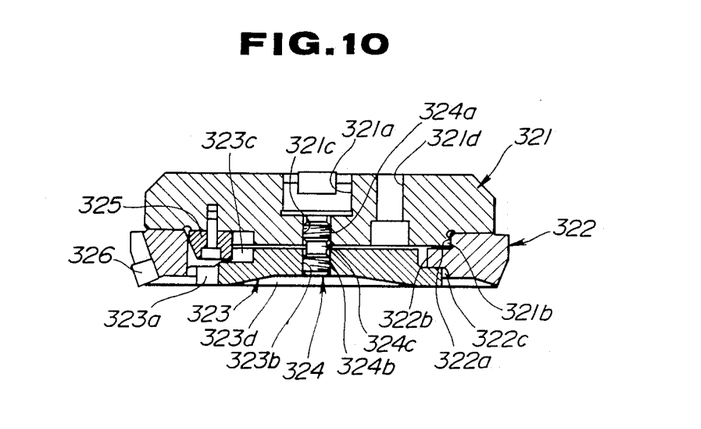
FIG. 10 is a view similar to FIG. 6, but showing a third embodiment of the invention.
Figure 11:
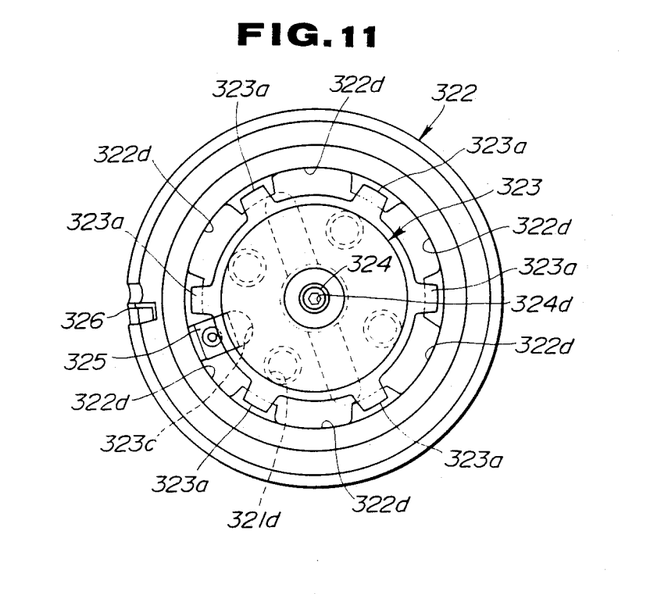
FIG. 11 is a front elevational view of the combination illustrated in FIG. 10.

Referring to FIGS. 10 and 11, there is shown a combination of a cutter and a fastener unit therefor, according to a third embodiment of the invention. In the third embodiment, the cutter includes a cutter body 322 which is adapted to be fastened to a forward end of a tool attachment shaft or an arbor 321 by means of a fastener unit including a clamper 323 and a fastener element 324.

The arbor 321 is adapted to be attached to a forward end of a work spindle for a machine tool or the like. To this end, the arbor 321 has a rearward end face which is formed at its center with a recess 321a into which a projection on the forward end of the work spindle can be fitted. The arbor 321 has a forward end face which is formed at its center with an axial projection 321b. The projection 321b has an end face formed at its center with an axially extending threaded bore 321c provided with right-hand threads. A key 325 is mounted to the forward end face of the arbor 321 at a location spaced a predetermined distance away from the axis of the arbor 321. Moreover, the arbor 321 is formed therein with a plurality of insertion bores 321d through which bolts are inserted respectively to fixedly fasten the arbor 321 to the work spindle for the machine tool.

In addition to the cutter body 322, the cutter includes a plurality of cutter inserts 326 which are mounted to an outer periphery of a forward end face of the cutter body 322 in circumferentially equidistantly spaced relation to each other. An axially extending, stepped through bore is formed at the center of the cutter body 322. The stepped through bore is composed of a large-diameter bore section 322a, a small-diameter bore section 322b and a recess 322c, which are arranged in the mentioned order from the rearward end face of the cutter body 322 facing toward the forward end face of the arbor 321. The large-diameter bore section 322a has such an inner diameter that the projection 321b on the arbor 321 is fitted precisely into the large-diameter bore section 322a. As clearly shown in FIG. 11, a plurality of axial grooves 322d are formed in the peripheral wall surface of the small-diameter bore section 322b in circumferentially equidistantly spaced relation to each other. The axial grooves 322d extend over the entire axial length of the small-diameter bore section 322b.

The clamper 323 has such an outer diameter as to be fitted into the small-diameter bore section 322b in the cutter body 322. Specifically, the clamper 323 has one axial end portion thereof adjacent the forward end face of the arbor 321. The one axial end portion of the clamper 323 is received in the small-diameter bore section 322b in the cutter body 322 in such a manner that the cutter body 322 is movable angularly about the axis thereof relatively to the clamper 323. The clamper 323 has a plurality of circumferentially equidistantly spaced projections 323a which project radially outwardly from the other axial end portion of the clamper 323. The arrangement is such that only when the axial grooves 322d in the cutter body 322 are axially aligned respectively with the projections 323a on the clamper 323, the cutter body 322 is permitted to move axially toward and away from the forward end face of the arbor 321 relatively to the clamper 323, while the projections 323a move respectively in and along the axial grooves 322d. The clamper 323 is formed therein with a threaded bore 323b provided with left-hand threads. The threaded bore 323b extends through the clamper 323 in coaxial relation to the threaded bore 321c in the end face of the projection 321b on the arbor 321. Further, the rearward end face of the clamper 323 facing toward the forward end face of the arbor 321 is formed with a key groove 323c into which the aforesaid key 325 can be fitted. Moreover, the forward end face of the clamper 323 is formed at its center with a recess 323d of such a depth as to permit chips from escaping.

The fastener element 324 has one axial end portion which is provided on its outer peripheral surface with right-hand threads 324a threadedly engageable with the threaded bore 321c in the end face of the projection 321b on the arbor 321. The other axial end portion of the fastener element 324 is provided on its outer peripheral surface with left-hand threads 324b threadedly engageable with the threaded bore 323b in the clamper 323. An end face of the other axial end portion of the fastener element 324 has a size equal to or smaller than an inner diameter of the threaded bore 323b in the clamper 323. In the illustrated embodiment, the end face of the other axial end portion of the fastener element 324 is substantially equal in diameter to the threaded bore 323b in the clamper 323. The fastener element 324 has a longitudinally intermediate section between the one and other axial end portions thereof. The intermediate section is formed on its outer peripheral surface with a circumferential relief groove 324c. As shown in FIG. 11, the fastener element 324 has a recess 324d of a hexagonal shape formed in the end face of the other axial end portion provided with the threads 324b.

In the arrangement illustrated in FIGS. 10 and 11, when it is desired to fasten the cutter body 322 to the arbor 321, the fastener element 324 is arranged between the end face of the projection 321b on the arbor 321 and the clamper 323 in coaxial relation to both the threaded bore 321c in the arbor 321 and the threaded bore 323b in the clamper 323 in a manner like that described previously with reference to the second embodiment shown in FIGS. 8 and 9. The forward end of the allen wrench is then inserted through the threaded bore 323b in the clamper 323, and is fitted into the hexagonal recess 324d in the end face of the other axial end portion of the fastener element 324. Subsequently, the allen wrench is turned to rotate the fastener element 314 about its axis, thereby bringing the threads 324a on the one axial end portion of the fastener element 324 into threaded engagement with the threaded bore 321c in the arbor 321. The threads 324b on the other axial end portion of the fastener element 324 are also brought into threaded engagement with the threaded bore 323b in the clamper 323. At this time, the clamper 323 is supported against rotation together with the fastener element 324. Thus, the turning movement of the allen wrench causes the clamper 323 to be moved toward the forward end face of the arbor 321. The key 325 mounted to the arbor 321 is fitted into the key groove 323c in the clamper 323. The spacing between the end face of the projection 321b on the arbor 321 and axial end faces of the respective projections 323a on the clamper 323, which face toward the end face of the projection 321b, is brought to a value slightly larger than the axial thickness of arcuate sections between the circumferentially spaced axial grooves 322d, i.e., the axial length of the small-diameter bore section 322b.

In this state, the cutter body 322 is arranged in front of the clamper 323, and the axial grooves 322d in the cutter body 322 are aligned respectively with the projections 323a on the clamper 323. The cutter body 322 is then moved toward the forward end face of the arbor 321. The projection 321b on the arbor 321 is fitted into the large-diameter bore section 322a in the cutter body 322. Subsequently, the cutter body 322 is moved angularly about the axis thereof relatively to the clamper 323 in a direction opposite to that in which the cutter body 322 is rotated at cutting. By doing so, the circumferential end of one of the axial grooves 322d is abutted against the key 325, so that the cutter body 322 remains at that position. Thus, the arcuate sections between the axial grooves 322d in the cutter body 322 are located between the respective projections 323a on the clamper 323 and the projection 321b on the arbor 321 and are overlapped respectively with the projections 323a. As the fastener element 324 is further rotated about its axis by the allen wrench, the clamper 323 is moved toward the arbor 321. The cutter body 322 is clamped between the arbor 321 and the clamper 323, and is fixedly fastened to the arbor 321.

On the other hand, when it is desired to detach the cutter body 322 from the arbor 321, the fastener element 324 is rotated about its axis in the direction opposite to that described above. This causes the projections 323a on the clamper 323 to be moved away from the cutter body 321. Subsequently, the cutter body 321 is moved angularly about the axis thereof relatively to the clamper 323 to bring the axial grooves 322d in the cutter body 322 into alignment with the respective projections 323a on the cutter body 323. The cutter body 323 is then moved axially away from the forward end of the arbor 321, and is detached therefrom.

In the arrangement of the third embodiment illustrated in FIGS. 10 and 11, since the fastener element 324 has no head, the depth of the recess 323d in the clamper 323, in which the head of the bolt has conventionally been accommodated, can be brought to a sufficiently small value of the order permitting chips to escape, making it possible to enhance the rigidity of the clamper 323. Further, rotation of the fastener element 324 about its axis enables the clamper 323 to be moved toward and away from arbor 321. Thus, the spring member required between the arbor and the clamper in the conventional arrangement can be dispensed with. Accordingly, the number of component parts is reduced, and the portions of the cutter body 322 where the clamp screws for the cutter inserts 326 are attached are simplified in construction, making it possible to reduce the cost.

What is claimed is:

1. A combination of a cutter body and a fastener unit for fastening said cutter body to a forward end of a tool attachment shaft in coaxial relation thereto, said forward end being formed in its end face with a threaded bore extending along an axis of rotation of said tool attachment shaft, said tool attachment shaft being adapted to rotate in a counterclockwise direction as viewed from said end face;

said cutter body having formed therein a threaded bore which extends through said cutter body in coaxial relation to said threaded bore in said forward end of said tool attachment shaft; and said fastener unit including a fastener element having one and other axial end portions, said one axial end portion being provided on its outer peripheral surface with first, right-hand threads threadably engageable with said threaded bore in said forward end of said tool attachment shaft, said other axial end portion being provided on its outer peripheral surface with second, left-hand threads threadably engageable with said threaded bore in said cutter body, and an end face of said other axial end portion having an outer diameter substantially equal to an inner diameter of said threaded bore in said cutter body, whereby rotation of said tool attachment shaft further tightens said cutter body to said tool attachment shaft.

2. A combination of a cutter and a fastener unit for fastening said cutter to a forward end of a tool attachment shaft in coaxial relation thereto, said forward end being formed in its end face with a threaded bore extending along an axis of said tool attachment shaft, said cutter including a cutter body formed therein with a through bore extending in coaxial relation to said threaded bore in said forward end of said tool attachment shaft, said cutter body having at least two axial grooves which are formed in a peripheral wall surface of said through bore and which extend in parallel relation to an axis of said through bore, said axial grooves being spaced from each other along the peripheral wall surface of said through bore, said fastener unit including a clamper formed therein with a threaded bore extending through said clamper in coaxial relation to said threaded bore in said forward end of said tool attachment shaft, said clamper having one axial end portion thereof adjacent said forward end of said tool attachment shaft, said one axial end portion of said clamper being received in said through bore of said cutter body in such a manner that said cutter body is movable angularly about the axis of said through bore relatively to said clamper, said clamper having at least two projections projecting radially outwardly from the other axial end portion of said clamper, the arrangement being such that only when said axial grooves in said cutter body are aligned respectively with said projections on said clamper, said cutter body is permitted to move axially toward and away from said forward end of said tool attachment shaft relatively to said clamper while said projections move respectively in and along said axial grooves, and said fastener unit further including a fastener element having one and other axial end portions, said one axial end portion of said fastener element being provided on its outer peripheral surface with first threads threadedly engageable with said threaded bore in said forward end of said tool attachment shaft, said other axial end portion of said fastener element being provided on its outer peripheral surface with second threads threadedly engageable with said threaded bore in said clamper, said first threads being reverse in a direction of helix to said second threads, and an end face of said other axial end portion of said fastener element having a size at most equal to an inner diameter of said threaded bore in said clamper.

3. A combination according to claim 2, wherein said first threads are right-hand threads, while said second threads are left-hand threads.

4. A combination according to claim 2, wherein said end face of said other axial end portion of said fastener element has an outer diameter substantially equal to the inner diameter of said threaded bore in said clamper.

5. A combination according to claim 2, wherein that section of said fastener element disposed between said one and other axial end portions is formed on its outer peripheral surface with a circumferential relief groove.

6. A combination according to claim 2, wherein said cutter body has opposite axial end faces one of which faces toward said end face of said forward end of said tool attachment shaft, and wherein said through bore in said cutter body is formed by a stepped bore comprising a first bore section, a second bore section smaller in diameter than said first bore section, a third cavity section larger in diameter than said second bore section, and a fourth bore section smaller in diameter than said third cavity section, which are arranged in the mentioned order from said one axial end face of said cutter body toward the other axial end face thereof, said first bore section having fitted thereinto a projection on the end face of said forward end of said tool attaching shaft, said second bore section having received therein said one axial end portion of said clamper, said third cavity section having accommodated therein said other axial end portion of said clamper, and said fourth bore section having such a diameter as to permit tool means for turning said fastener element about its axis, to access to said end face of said other axial end portion of said fastener element.

7. A combination according to claim 2, wherein said clamper has an axial end face remote from said forward end of said tool attachment shaft, said axial end face of said clamper being formed therein with a central recess having a depth enabling chips to escape.

* * * * *

UNITED STATES PATENT AND TRADEMARK OFFICE
CERTIFICATE OF CORRECTION

PATENT NO. : 4,964,762

DATED : October 23, 1990

INVENTOR(S) : ARAI, et al.

It is certified that error appears in the above-identified patent and that said Letters Patent is hereby corrected as shown below:

On the Title Page:

[30]　　　　Foreign Application Priority Data

Sep. 18, 1987 [JP]　　Japan................. 62-142675

Sep. 22, 1987 [JP]　　Japan................. 62-144715

Signed and Sealed this

Twenty-ninth Day of September, 1992

Attest:

DOUGLAS B. COMER

Attesting Officer　　　　Acting Commissioner of Patents and Trademarks